(12) United States Patent
Bazzarella et al.

(10) Patent No.: US 7,338,545 B2
(45) Date of Patent: Mar. 4, 2008

(54) APPARATUS FOR SEPARATING LIQUID FROM A PROCESS GAS STREAM OF AN ELECTROCHEMICAL CELL STACK

(75) Inventors: Ricardo Bazzarella, Cambridge (CA); Todd A. Simpson, Brampton (CA)

(73) Assignee: Hydrogenics Corporation, Mississauga (CA)

( * ) Notice: Subject to any disclaimer, the term of this patent is extended or adjusted under 35 U.S.C. 154(b) by 264 days.

(21) Appl. No.: 10/925,911

(22) Filed: Aug. 26, 2004

(65) Prior Publication Data
US 2005/0044825 A1 Mar. 3, 2005

Related U.S. Application Data

(60) Provisional application No. 60/497,548, filed on Aug. 26, 2003.

(51) Int. Cl.
*B01D 45/12* (2006.01)
(52) U.S. Cl. ............... 55/399; 55/355; 55/413; 55/421; 55/423; 55/450; 55/456
(58) Field of Classification Search ............ 55/410, 55/413, 421, 423, 426, 355, 348, 392–399, 55/447, 449, 450, 456, 457; 137/247–254; 210/163, 164
See application file for complete search history.

(56) References Cited

U.S. PATENT DOCUMENTS

| | | | |
|---|---|---|---|
| 3,724,180 A | 4/1973 | Morton et al. | |
| 3,796,026 A * | 3/1974 | Mugford | 55/338 |
| 3,955,948 A * | 5/1976 | Campolong | 55/394 |
| 4,179,273 A * | 12/1979 | Montusi | 55/457 |
| 4,509,965 A | 4/1985 | Morton | |
| 4,525,182 A * | 6/1985 | Rising et al. | 96/6 |
| 4,834,887 A | 5/1989 | Broughton | |
| 5,853,443 A | 12/1998 | Rodgers et al. | |
| 6,110,246 A * | 8/2000 | Eubank | 55/394 |
| 6,331,195 B1 | 12/2001 | Faust et al. | |
| 6,524,373 B2 * | 2/2003 | Afeiche et al. | 95/269 |
| 6,540,802 B2 * | 4/2003 | Trautmann et al. | 55/337 |
| 6,579,637 B1 | 6/2003 | Savage et al. | |
| 6,620,217 B2 | 9/2003 | Bruckmann et al. | |

(Continued)

FOREIGN PATENT DOCUMENTS

DE 2702148 A1 7/1978

(Continued)

*Primary Examiner*—Duane Smith
*Assistant Examiner*—Robert A Clemente
(74) *Attorney, Agent, or Firm*—Bereskin & Parr

(57) ABSTRACT

A liquid separator includes a housing, a separation chamber disposed within the housing, a drain, an inlet channel, a swirler disposed within the inlet channel, and an outlet channel. The drain has a drain passageway for draining liquid from the separation chamber. The inlet channel is configured to communicate the fluid stream from a first inlet end to a second inlet end disposed within the housing and proximate the separation chamber. The outlet channel is configured to communicate the fluid stream from a first outlet end positioned proximate the second inlet end, to a second outlet end remote from the separation chamber. The drain passageway has an inner diameter sized such that the interaction between the surface tension of the liquid and the inner passageway causes some liquid to be retained in the drain passageway, to form a low pressure gas seal of the drain passageway.

15 Claims, 3 Drawing Sheets

U.S. PATENT DOCUMENTS 6,811,698 B2 * 11/2004 Romanyszyn ............ 210/512.1
6,962,199 B1 * 11/2005 Tjeenk Willink ............ 166/265

FOREIGN PATENT DOCUMENTS

| | | |
|---|---|---|
| EP | 1 087 888 | 9/2003 |
| FR | 2394329 | 1/1979 |
| FR | 2558741 | 8/1985 |
| GB | 1206007 | 9/1970 |
| JP | 03293009 | 12/1991 |
| JP | 2003001034 | 1/2003 |
| JP | 2003038985 | 2/2003 |

* cited by examiner

APPARATUS FOR SEPARATING LIQUID FROM A PROCESS GAS STREAM OF AN ELECTROCHEMICAL CELL STACK

The present application claims priority from U.S. provisional patent application No. 60/497,548 filed on Aug. 26, 2003, which is incorporated herein by reference in its entirety.

FIELD OF THE INVENTION

The present invention relates generally to the field of fluid separators, with common but by no means exclusive application to electrochemical cell systems.

BACKGROUND OF THE INVENTION

Fuel cells and electrolyzer cells are generally referred to as electrochemical cells. Fuel cells have been proposed as clean, efficient and environmentally friendly power sources that have various applications. A conventional proton exchange membrane (PEM) fuel cell is typically comprised of an anode, a cathode, and a selective electrolytic membrane disposed between the two electrodes.

A fuel cell generates electricity by bringing a fuel gas (typically hydrogen) and an oxidant gas (typically oxygen) respectively to the anode and the cathode. In reaction, a fuel such as hydrogen is oxidized at the anode to form cations (protons) and electrons. The proton exchange membrane facilitates the migration of protons from the anode to the cathode while preventing the electrons from passing through the membrane. As a result, the electrons are forced to flow through an external circuit thus providing an electrical current. At the cathode, oxygen reacts with electrons returned from the electrical circuit to form anions. The anions formed at the cathode react with the protons that have crossed the membrane to form liquid water.

In contrast, an electrolyzer uses electricity to electrolyze water to generate oxygen from its anode and hydrogen from its cathode. Similar to a fuel cell, a typical solid polymer water electrolyzer (SPWE) or proton exchange membrane (PEM) electrolyzer is also comprised of an anode, a cathode and a proton exchange membrane disposed between the two electrodes. Water is introduced to, for example, the anode of the electrolyzer which in turn is connected to the positive pole of a suitable direct current voltage. Oxygen is produced at the anode. The protons then migrate from the anode to the cathode through the membrane. On the cathode which is connected to the negative pole of the direct current voltage, the protons conducted through the membrane are reduced to hydrogen.

In practice, the cells are not operated as single units. Rather, the cells are connected in series, either stacked one on top of the other or placed side by side. The series of cells, referred to as a cell stack, is normally enclosed in a housing. For a fuel cell stack, the fuel and oxidant are directed through manifolds in the housing to the electrodes. The fuel cell is cooled by either the reactants or a cooling medium. The fuel cell stack also comprises current collectors, cell-to-cell seals and insulation while the required piping and instrumentation are provided external to the fuel cell stack. The fuel cell stack, housing and associated hardware constitute a fuel cell module. Likewise, electrolyzer cells are also typically connected in series to form an electrolyzer stack.

A common problem that has to be addressed, for both fuel cell stacks and electrolyzer stacks, is the controlled removal of water from the process gas streams. The presence of water in the gas streams reduces the efficiency of the electrochemical cell.

The inventors have accordingly recognized a need for a fluid separation device for separating liquid from a fluid stream, and adapted for use with electrochemical cells.

SUMMARY OF THE INVENTION

This invention is directed towards a liquid separator configured to separate liquid from a fluid stream The separator includes a housing, a separation chamber disposed within the housing, a drain, an inlet channel, a swirler disposed within the inlet channel, and an outlet channel. The drain has a drain passageway for draining liquid from the separation chamber. As well, the inlet channel is configured to communicate the fluid stream from a first inlet end to a second inlet end disposed within the housing and proximate the separation chamber. The outlet channel is configured to communicate the fluid stream from a first outlet end positioned proximate the second inlet end, to a second outlet end remote from the separation chamber.

Preferably, the drain passageway comprises an inner diameter which is sized such that the interaction between the surface tension of the liquid and the inner passageway causes some liquid to be retained in the drain passageway, the retained liquid forming a low pressure gas seal of the drain passageway. The drain passageway is preferably substantially horizontal.

Preferably, too, the inlet channel flares radially outwardly proximate the second inlet end such that the diameter of the inlet channel at the second inlet end is larger than the diameter of the inlet channel proximate the swirler.

The housing preferably includes a base and a cap which is removably mountable to the base.

BRIEF DESCRIPTION OF THE DRAWINGS

The present invention will now be described, by way of example only, with reference to the following drawings, in which like reference numerals refer to like parts and in which.

DETAILED DESCRIPTION OF THE INVENTION

Figure 1:
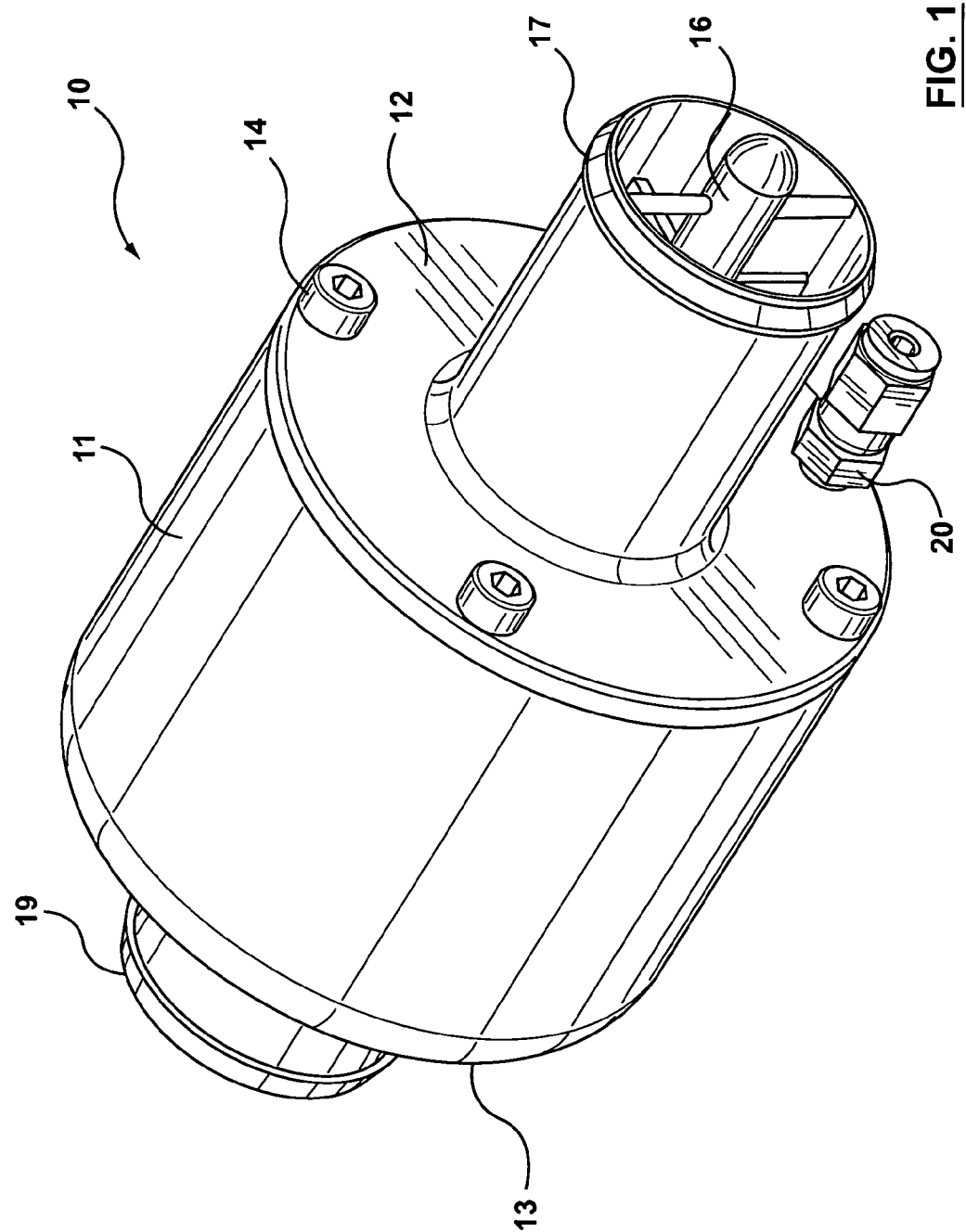
FIG. 1 is a front elevated perspective view of a liquid separator made in accordance with the present invention.
Figure 2:
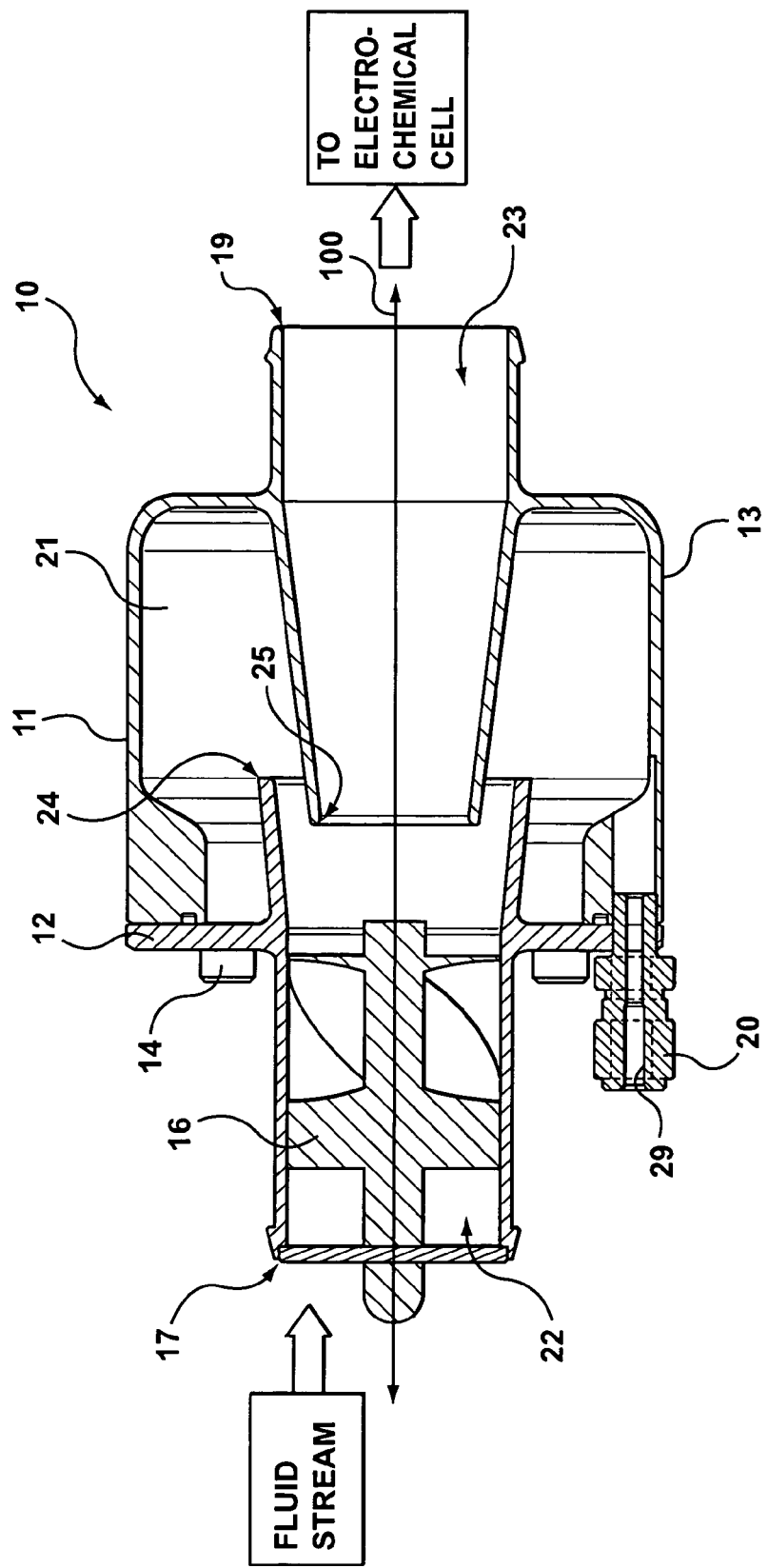
FIG. 2 is a side cross-sectional view of the liquid separator of FIG. 1.

Referring simultaneously to FIGS. 1 and 2, illustrated therein is a liquid separator, referred to generally as 10, made in accordance with the present invention. The separator 10 includes a main housing 11 having a cap portion 12 and a base 13. The cap 12 is removably mounted to the base 13, typically through the use of screws 14 or nuts and bolts. A substantially cylindrical separation chamber 21 is provided within an interior region of the housing 11. For most low-pressure applications, the housing 11 may be made of plastic or other suitable material.

A generally cylindrical inlet channel 22 is provided through the cap 12, and configured for communicating a fluid stream (typically comprising water droplets and oxygen or hydrogen as a process gas) from a first inlet end 17 to a second inlet end 24, proximate the separation chamber 21. An o-ring or other type of seal may be provided around the exterior (or interior) circumference of the inlet channel 22, to facilitate the coupling of an inlet hose or other conduit for the supply of a fluid stream containing process gas.

Figure 4:
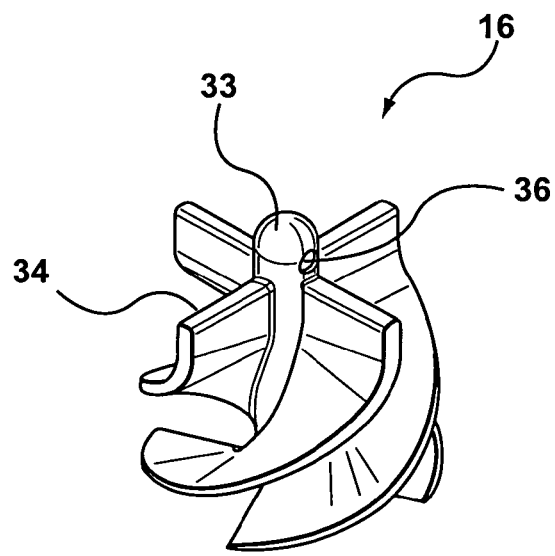
FIG. 4 is a top perspective view of the swirler of the liquid separator of FIG. 1.

A swirler 16 is removably mounted within the inlet channel 22. As shown in FIG. 4, the swirler 16 is substantially propeller-shaped, having a plurality of arcuate vanes 34, spiraling about an axial shaft 33. A pin hole 36 may be provided through the axial shaft 33, to receive a pin or similar device for releasably mounting the swirler to the inlet channel 22. Having a removable swirler 16 facilitates maintenance and cleaning of the separator 10.

As can be seen in FIG. 2, proximate the swirler 16, the inlet channel 22 begins to taper radially outwardly, such that the cross-sectional diameter of the channel 22 is larger at the second inlet end 24 than the cross-sectional diameter of the channel 22 proximate the swirler 16. The tapered portion of the channel 22 is substantially frusto-conical.

A generally tubular outlet channel 23 is formed in the base 12, and communicates fluids between a first outlet end 25 positioned proximate the second inlet end 24, and a second outlet end 19 remote from the separation chamber 21. The outlet channel 23 forms a fluid communication between the separation chamber 21 and the exterior of the housing 11. From the first outlet end 25 towards the second outlet end 19, the channel 23 tapers generally outwardly for a portion of the channel 23, so as to be generally frusto-conical. As a result, the cross-sectional diameter of the channel 23 is smaller at the first outlet end 25 than the cross-sectional diameter of the channel 23 at the second outlet end 19. As well, typically, the first outlet end 25 will be inset slightly within the inlet channel 22, proximate the second inlet end 24. As a result, the overlapping portions of the inlet channel 22 and outlet channel 23 form an annular space or gap therebetween, through which the fluid is permitted to flow.

An o-ring or other type of seal may be provided around the exterior (or interior) circumference of the outlet channel 23, to facilitate the coupling of an outlet hose or other conduit for directing the fluid stream (from which liquid has been removed by the separator 10) to the electrochemical cell.

The first outlet end 25 is slightly inset within and generally axially aligned with the second inlet end 24. Preferably, the inlet channel 22, swirler 16, separation chamber 21, and outlet channel 23 are substantially coaxially aligned, eg about a central axis illustrated illustrated generally as 100. Preferably the central axis 100 is substantially horizontal.

A drain 20 is provided proximate a lowest point of and in fluid communication with the separation chamber 21. In the illustrated embodiment, the lowest points of the separation chamber 21 (and correspondingly the location of the drain 20) lie beneath the central axis 100. The drain 20 includes a drain passageway 29 for evacuating out of the separation chamber 21 liquid which has been separated from the fluid stream. To minimize the external dimensions of the separator 10, preferably the drain passageway 29 is substantially horizontal, and further preferably the passageway 29 is parallel to the central axis 100.

The inner diameter 29' of the drain passageway 29 is sized such that the interaction between the surface tension of the liquid and the inner surface of the drain passageway 29 causes some liquid (eg. droplets or slugs of water 32) to be retained in the drain passageway 29. As will be understood, for liquids possessing a higher surface tension, the diameter 29' of the drain passageway 29 may be larger than for liquids possessing a lower surface tension. The retained liquid forms a low pressure gas seal of the drain passageway, and automatically drains water on a substantially regular basis when a sufficient volume of water is present in the drain line or passageway 29 and the separator to overcome the surface tension holding the slugs 32. In this way, the need of a drain valve that is commonly used in the field to drain water out of a gas stream is avoided. Pressure typically increases with gas flow rate and water regularly produced or condensed, and a small flow rate of gas out the drain line is not detrimental when used for the cathode exhaust water knockout separator of a fuel cell system, for instance. A drain line (not shown) may be coupled to the drain passageway 29 to direct separated liquid to a desired site either for disposal or recycling.

In use, a fluid stream formed of a combination of gas and liquid droplets are directed under typically low pressure (eg. 3-10 psi) into the first inlet end 17 of the inlet channel 22. The fluid stream passes over the vanes 34 of the swirler 16, causing the fluid stream to swirl radially outwardly in cyclonic fashion and against the interior surface of the inlet channel 22, before emerging into the separation chamber 21 and against the interior surface of the chamber 21. As will be understood, the spinning motion imparted to the fluid stream creates centrifugal forces which cause the liquid droplets to impinge upon and collect against the interior surfaces of the inlet channel 22 and the separation chamber 21. Liquid droplets collecting within the inlet channel 22 are urged by the flow of the fluid stream into the separation chamber 21.

Figure 3:
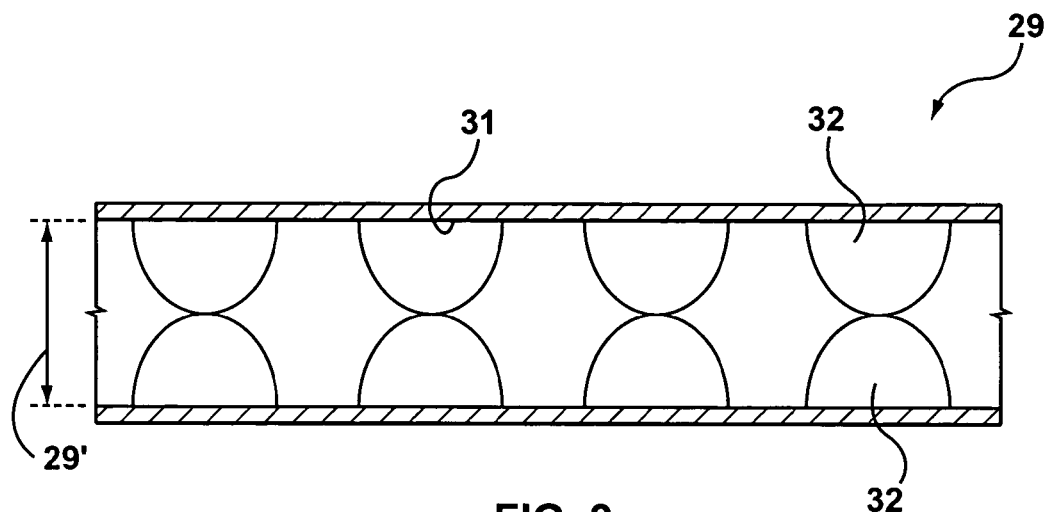
FIG. 3 is a schematic side view of the drain passageway of the liquid separator of FIG. 1.

As liquid collects in the separation chamber 21, gravity draws the liquid downwards to the chamber's 21 lowest points, and the liquid exits the chamber 21 through the drain 20. As noted, because of surface tension between the liquid and the interior surface 31 of the drain passageway 29, in conjunction with the interior diameter of the drain passageway 29, some liquid (such as the droplets 32 illustrated in FIG. 3) is retained in the passageway 29. This retained liquid forms a valve, thereby preventing the escape of any process gas from the fluid stream.

The fluid stream (with at least some and preferably most of the liquid removed) is then able to enter the outlet channel 23 via the first outlet end 25 and exit the separation chamber 21 ultimately exit the outlet channel 23 and the separator 10 through the second outlet end 19.

As noted previously, the housing 11 for the separator 10 preferably includes a base 13 and a cap 12 which is removably mountable to the base 13. Such a design facilitates the cleaning and maintenance of the separator 10, generally. Preferably, upon removal of the cap 12, the inlet and outlet channels 22, 23, the separation chamber 21 and the drain 20 may be easily accessed for cleaning or maintenance.

Thus, while what is shown and described herein constitute preferred embodiments of the subject invention, it should be understood that various changes can be made without departing from the subject invention, the scope of which is defined in the appended claims.

The invention claimed is:

1. A liquid separator configured to separate liquid from a fluid stream, the separator comprising:
   a) a housing;
   b) a separation chamber disposed within the housing;
   c) a drain having a drain passageway for draining liquid from the separation chamber;

d) an inlet channel configured to communicate the fluid stream from a first inlet end to a second inlet end thereof disposed within the housing and proximate the separation chamber;

e) a swirler disposed within the inlet channel; and f) an outlet channel configured to communicate the fluid stream from a first outlet end positioned proximate the second inlet end, to a second outlet end remote from the separation chamber, wherein the drain passageway is sized such that the interaction between the surface tension of the liquid and the passageway causes some liquid to be retained in the drain passageway, the retained liquid forming a low pressure gas seal of the drain passageway and being retained substantially only by the surface tension.

2. The liquid separator as claimed in claim 1, wherein the drain passageway is circular and has an inner diameter which is sized to provide said interaction between the surface tension of the liquid and the inner passageway to cause liquid to be retained in the drain passageway, thereby to form the low pressure gas seal.

3. The liquid separator as claimed in claim 1, wherein the separation chamber is substantially cylindrical.

4. The liquid separator as claimed in claim 1, wherein the drain is positioned proximate a lowest point of the separation chamber.

5. The liquid separator as claimed in claim 4, wherein the drain passageway is substantially horizontal.

6. The liquid separator as claimed in claim 1, wherein the inlet channel flares radially outwardly proximate the second inlet end such that the diameter of the inlet channel at the second inlet end is larger than the diameter of the inlet channel proximate the swirler.

7. The liquid separator as claimed in claim 6, wherein the inlet channel adjacent the second inlet end is frusto-conical, wherein the outlet channel adjacent the first outlet is generally frusto-conical and located at least partially within the second inlet end.

8. The liquid separator as claimed in claim 1, wherein the housing includes a base and a cap, which is removably mountable to the base.

9. The liquid separator as claimed in claim 8, wherein the inlet channel passes through the cap.

10. The liquid separator as claimed in claim 1, wherein the inlet channel is substantially aligned about a central axis.

11. The liquid separator as claimed in claim 10, wherein the outlet channel is substantially aligned about the central axis.

12. The liquid separator as claimed in claim 10, wherein the separation chamber is substantially aligned about the central axis.

13. The liquid separator as claimed in claim 1, wherein the inlet channel, the outlet channel and the separation chamber are substantially coaxial.

14. A liquid separator configured to separate liquid from a fluid stream, the separator comprising:

a) a main housing having a cap portion and a base, the cap portion being removably mounted to the base;

b) a separation chamber disposed within the housing;

c) a drain having a drain passageway for draining liquid from the separation chamber;

d) an inlet channel integral with the cap portion, and configured to communicate the fluid stream from a first inlet end to a second inlet end thereof disposed within the housing and proximate the separation chamber;

e) a swirler disposed within the inlet channel; and f) an outlet channel integral with the base, and configured to communicate the fluid stream from a first outlet end positioned proximate the second inlet end, to a second outlet end remote from the separation chamber, wherein the drain passageway is sized such that the interaction between the surface tension of the liquid and the passageway causes some liquid to be retained in the drain passageway, the retained liquid forming a low pressure gas seal of the drain passageway and being retained substantially only by the surface tension;

wherein the drain is positioned proximate a lowest point of the separation chamber and wherein the drain passageway is substantially horizontal; and wherein the inlet channel, the outlet channel and the separation chamber are substantially coaxial, wherein the inlet channel adjacent the second inlet end is frusto-conical, and wherein the outlet channel adjacent the first outlet is generally frusto-conical and located at least partially within the second inlet end.

15. A liquid separator in combination with an electrochemical cell, the liquid separator being configured to separate liquid from a gas stream supplied to the electrochemical cell, the liquid separator comprising:

g) a housing;

h) a separation chamber disposed within the housing;

i) a drain having a drain passageway for draining liquid from the separation chamber;

j) an inlet channel configured to communicate the fluid stream from a first inlet end to a second inlet end thereof disposed within the housing and proximate the separation chamber;

k) a swirler disposed within the inlet channel; and l) an outlet channel configured to communicate the fluid stream from a first outlet end positioned proximate the second inlet end, to a second outlet end remote from the separation chamber, wherein the drain passageway is sized such that the interaction between the surface tension of the liquid and the passageway causes some liquid to be retained in the drain passageway, the retained liquid forming a low pressure gas seal of the drain passageway and being retained substantially only by the surface tension;

and wherein the second outlet end is connected to an inlet of the electrochemical cell for supply of the gas stream substantially free of liquid.

* * * * *